United States Patent [19]
Yang

[11] Patent Number: 6,137,271
[45] Date of Patent: Oct. 24, 2000

[54] AUTOMATIC POLARITY EXCHANGE CIRCUIT WITH CURRENT DETECTION FEEDBACK CAPABILITIES

[76] Inventor: Tai-Her Yang, No. 59, Chung Hsing 8 St., Si-Hu Town, Dean-Hwa, Taiwan

[21] Appl. No.: 09/377,730

[22] Filed: Aug. 19, 1999

[51] Int. Cl.[7] .................................................. H02J 7/16

[52] U.S. Cl. .......................................... 320/165; 320/137

[58] Field of Search ................................... 320/165, 137; 361/245

[56] References Cited

U.S. PATENT DOCUMENTS

| | | | |
|---|---|---|---|
| 4,663,579 | 5/1987 | Yang | 320/103 |
| 4,994,727 | 2/1991 | Yang | 320/105 |
| 5,453,643 | 9/1995 | Yang | 307/71 |
| 5,831,455 | 11/1998 | Chen | 327/28 |

*Primary Examiner*—Peter S. Wong
*Assistant Examiner*—Lawrence Luk
*Attorney, Agent, or Firm*—Bacon & Thomas, PLLC

[57] ABSTRACT

An automatic polarity exchange circuit with current detection feedback capabilities includes a forward polarity detector connected in parallel with a reverse polarity detector to respectively drive a positive switch or reverse polarity switch in the automatic polarity exchanger pursuant to the outcome of the polarity detection, as performed on the switches. Meanwhile, the hypersensitivity effect due to a control operation is prevented by a time delay caused by a series-on delay circuit integral with the automatic polarity exchange switch assembly and a current divider switching circuit that is controlled by a load current detection circuit and connected in parallel with the series-on delay circuit, which turns to a conducting state once the working current produced by a correct linkage of polarities on the power supply side with the loading side yields an output, to the effect that:

(1) the divider switching circuit functions as a replacement for the series-on delay circuit so that the automatic polarity exchange switch assembly will continue operation;

(2) at which time the series-on delay circuit is reset to the stand-by state; and (3) when the load breaks open or the load current scales down, the automatic polarity exchange switch assembly is cut off to cut off power to the load, and the whole system resets itself.

4 Claims, 4 Drawing Sheets

AUTOMATIC POLARITY EXCHANGE CIRCUIT WITH CURRENT DETECTION FEEDBACK CAPABILITIES

BACKGROUND OF THE INVENTION (a) Field of the Invention

The invention relates to an automatic polarity exchange circuit with current detection feedback capabilities.

(b) Description of the Prior Art

In the prior art polarity exchange circuit exemplified by U.S. Pat. No. 4,663,579, incorporated by reference herein, the load on one side, when removed, will not disengage the polarity switch. As a result, the polarity switch remains active and, unless the circuit is reset, presents a risk of polarity error when the load is changed back later on.

SUMMARY OF THE INVENTION

A primary object of the invention, therefore, lies in the provision of an automatic polarity exchange circuit with current detection feedback capabilities, comprising essentially a forward polarity detector (PDF) connected in parallel with a reverse polarity detector (PDR) to respectively drive a positive switch or reverse polarity switch in the automatic polarity exchanger pursuant to the outcome of the polarity detection, as performed on the switches. Meanwhile, the hypersensitivity effect due to control operation is prevented by a time delay caused by a series-on delay circuit integral with the automatic polarity exchange switch assembly and a current divider switching circuit that is controlled by a load current detection circuit and connected in parallel with the series-on delay circuit, which turns to a conducting state once the working current produced by a correct linkage of polarities on the power supply side with the loading side yields an output, to the effect that:

(1) the divider switching circuit functions as a replacement for the series-on delay circuit so that the automatic polarity exchange switch assembly will continue operation;

(2) at which time the series-on delay circuit is reset to the stand-by state; and (3) when the load breaks open or the load current scales down, the automatic polarity exchange switch assembly is cut off to cut off power to the load, and the whole system resets itself.

DETAILED DESCRIPTION OF THE PREFERRED EMBODIMENTS

Figure 1:
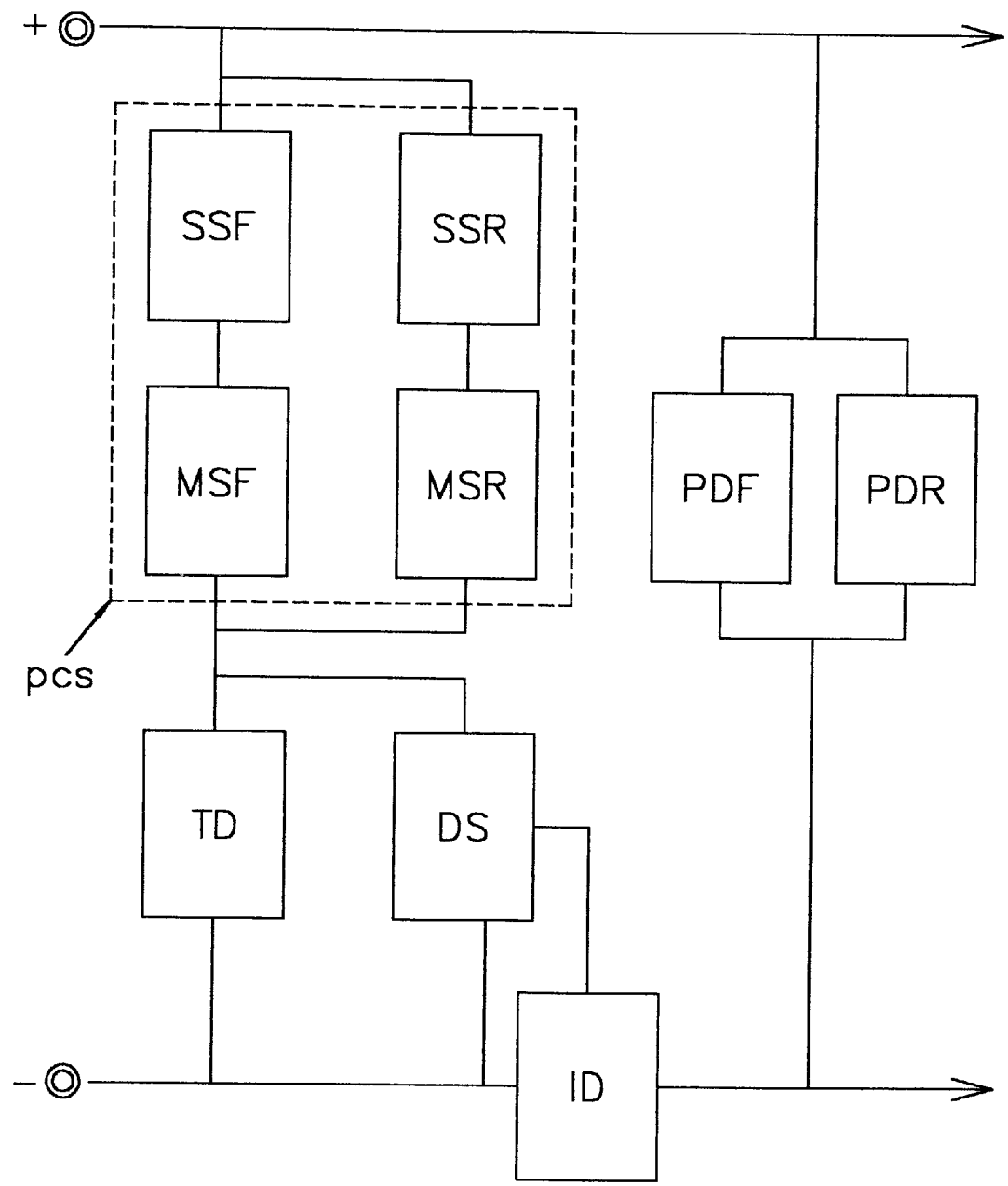
FIG. 1 is a block diagram of the main part of an automatic polarity exchange circuit with current detection feedback capabilities according to the invention.

As shown in FIG. 1, an automatic polarity exchange circuit with current detection feedback capabilities according to the invention comprises essentially:

a forward polarity detector (PDF) composed of an electric/mechanic device or of solid state electronic parts, arranged to drive a positive polarity supplementary switch (SSF) with control power when the power being detected is of a positive polarity, and in turn causes a positive polarity switch (MSF) in an automatic polarity exchange switch assembly (PCS) to operate;

a reverse polarity detector (PDR) composed of an electrical/mechanical device or of solid state electronic components arranged to drive a reverse polarity supplementary switch (SSR) with control power when the power being detected is of a reverse polarity, and in turn to operate a reverse polarity switch in the automatic polarity exchange switch assembly (PCS);

automatic polarity exchange switch assembly (PCS) is composed of an electrical/mechanical device or of solid state electronic components, comprising forward polarity switch (MSF), reverse polarity switch (MSR) and a positive polarity supplementary switch (SSF) in series with the control end of the forward polarity switch (MSF) on the one hand, and reverse polarity supplementary switch (SSR) in series with the control end of reverse polarity switch (MSR), all of which are constructed of an electrical/mechanical device or solid state electronic components; both the forward polarity switch (MSF) and the reverse polarity switch (MSR) being controlled by a time delay circuit (TD) connected in series, the forward polarity switch (MSF) serving to connect the power supply and the load side when both are of a like polarity, that is, in phase, by way of time delay circuit (TD) whereas the reverse polarity switch (MSR) serves to connect the power supply and the load side when both are of contrary polarity, that is, out of phase, with respect to each other;

divider switching circuit (DS) is composed of a mechanical/electrical device or solid state electronic circuit connected in parallel with the serial type time delay circuit (TD) controlled by a load current detector (ID) to:

(1) function in substitution for the serial type time delay circuit (TD) so that the automatic polarity exchange switch assembly may work continually;

(2) during which time the serial type time delay circuit (TD) will reset to a stand by status; and (3) the automatic polarity exchange assembly will be cut off so as to disconnect the power supply and load detector when the load suspend current starts to decrease, so that the system is reset.

load current detector (ID) is composed of a mechanical/ electrical device or solid state electronic components arranged to drive divider switch (DS) into conduction when the load current exceeds a prescribed level, and to drive divider switch (DS) to an OFF state when the current scales down to a level below the prescribed level or suspends.

The control mechanism of the above mentioned circuits operates as follows:

When the power supply and the load are in parallel and both are in phase, the positive polarity switch will function after the duly delayed time so that power supply and load are connected, and, when the current is greater than the prescribed level, a signal from the load current detector will drive the divider switch circuit to bring about a division of current so as to maintain the circuit in normal operation and to reset the serial time delay circuit;

When the power supply and the load are in parallel, and both are out of phase with each other, the reverse polarity switch will function after the duly delayed time, so that the power supply and the load are exchanged in polarity, resulting in in-phase conduction, and when the current is greater than the prescribed level, a signal from the load current detector will drive the divider switch circuit to conduction, so as to maintain circuit operation and reset the serial time delay circuit;

When the load current decreases to a level below the prescribed level or when the load is removed, the current is cut off, the divider switch circuit will open, and the system reset.

Figure 2:
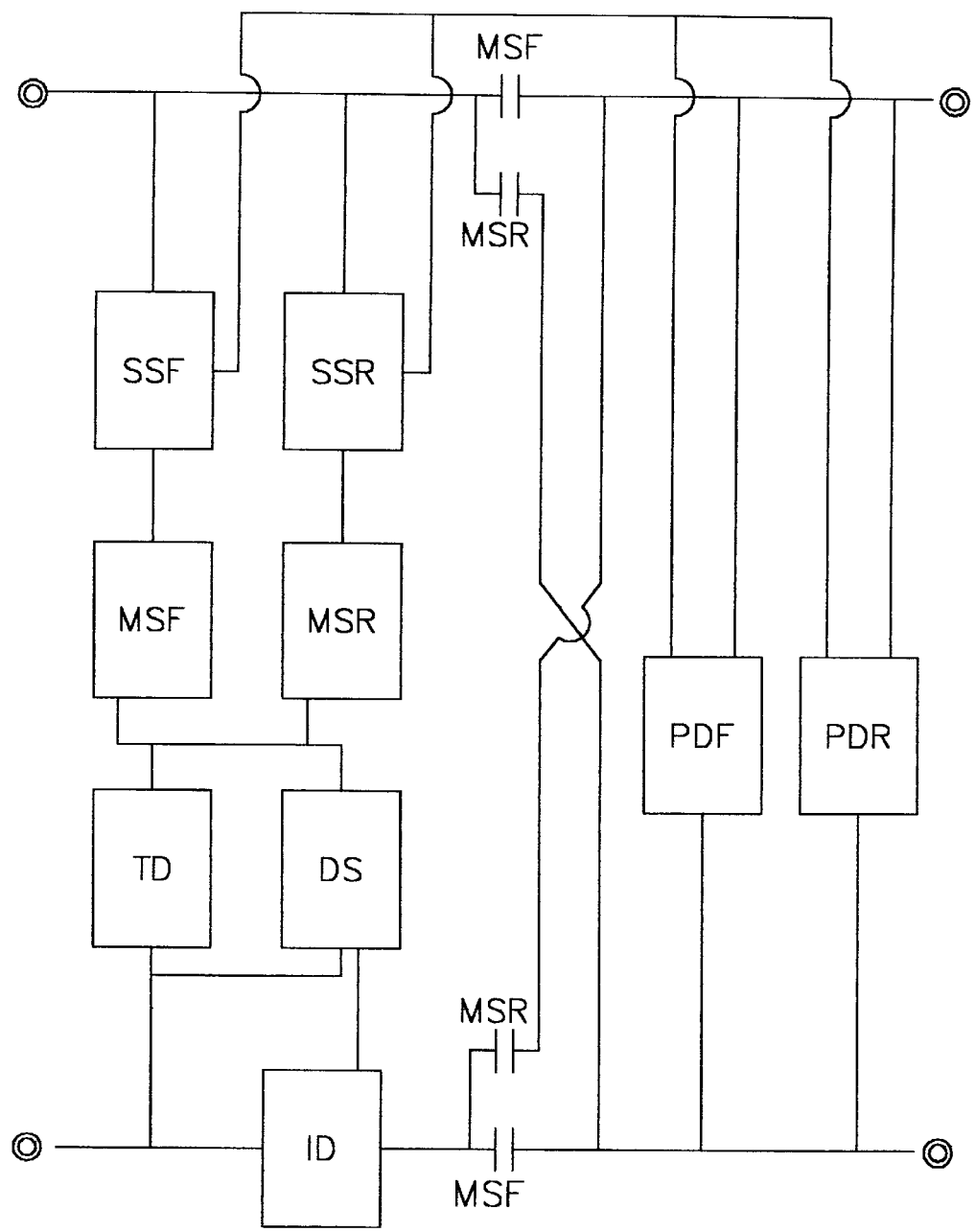
FIG. 2 is a block diagram of a preferred embodiment of the invention for application in a load side automatic polarity exchange.

Referring to FIG. 2, which is a block diagram of a preferred embodiment of the invention for the application in a load side automatic polarity exchange, featuring a forward polarity switch and a reverse polarity switch composed of mechanical/electrical contacts corresponding to the switches shown in FIG. 1 respecting circuitry and exchange functions.

Figure 3:
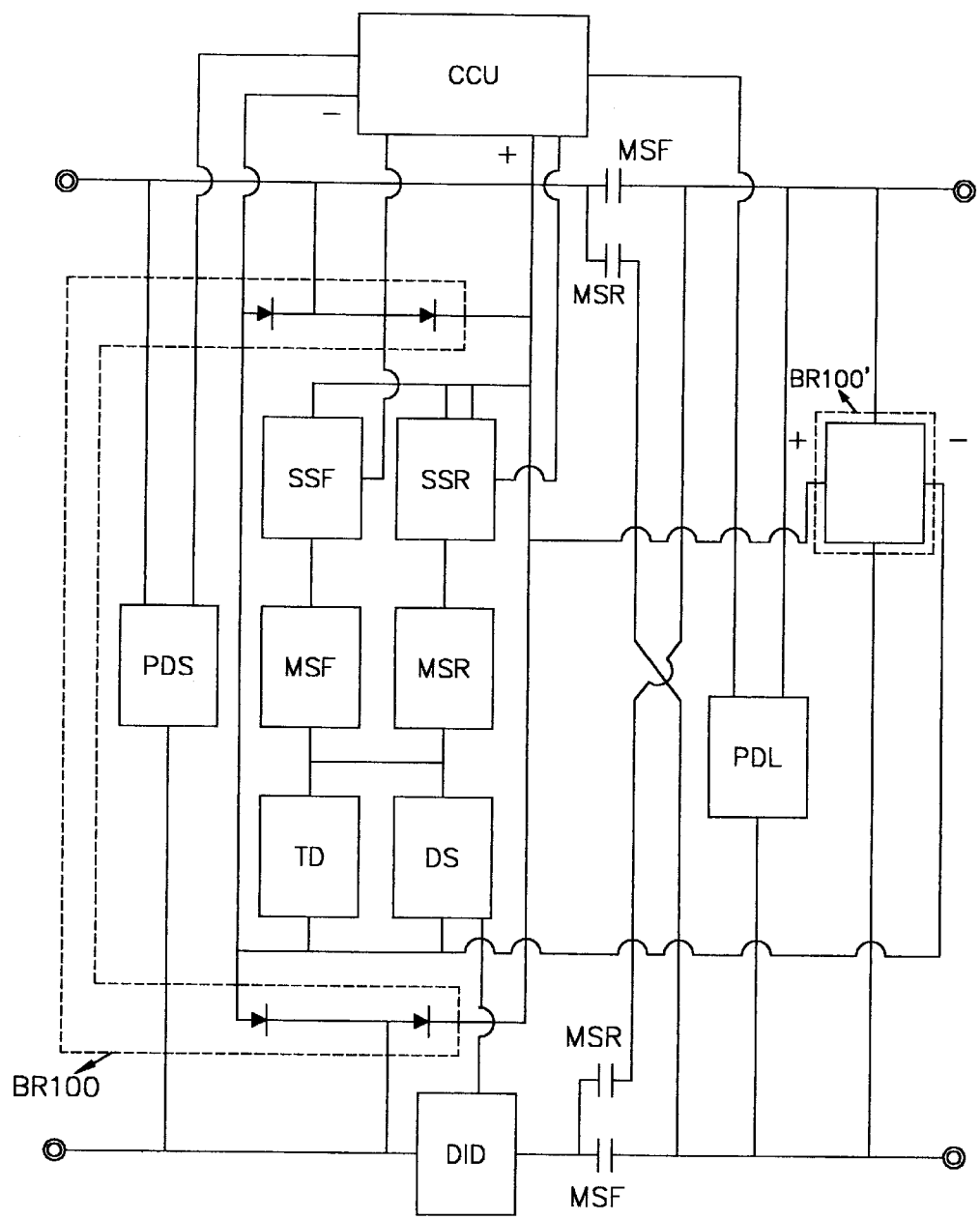
FIG. 3 is a block diagram of a preferred automatic polarity exchange circuit with current detection feedback capabilities applied to a bilateral automatic identification circuit system.

FIG. 3 is a block diagram of a preferred automatic polarity exchange circuit with a current detection feedback capabilities applied to a bilateral automatic identification circuit system, comprising essentially:

A dual current detector composed of a mechanical/electrical device or solid state electronic components, capable of bi-directional current detection, whereby a correspondent signal is produced to control the divider switch circuit on the power supply side;

Power supply side polarity detector (PDS) composed of mechanical/electrical device or solid state electronic parts, serving to detect load side polarity, whereby a correspondent signal is produced to be fed to the central control unit (CCU) 100;

Load side polarity detector (PDL) composed of a mechanical/electrical device or solid state electronic parts, serving to detect load side polarity, whereby a correspondent signal is produced to be fed to the central control unit 100;

Central control unit (CCU) 100 composed of a mechanical/electrical device or solid state electronic parts, serving to receive the polarity identification signal from the power supply side polarity detector and the load side polarity detector (PDL) so as to drive the positive polarity supplementary switch (SSP) and the forward polarity switch (MSF) in case the power supply side and the load side are in phase with each other, but to drive the reverse polarity switch (MSR) and the reverse polarity supplementary switch (SSR) in the event both are out of phase with each other, thus executing polarity exchange for useful interconnections;

A bridge rectifier BR 100 with its A.C. terminal connected in parallel with the power supply side, and with the bridge rectifier BR 100' connected in parallel across both terminals of the load, the D.C. output of both bridges being paralleled with like polarity on like polarity so as to deliver power to the central control unit (CCU) 100;

Forward Polarity Supplementary Switch (SSF) and forward polarity switch (MSF) connected in series; and reverse polarity supplementary switch (SSR) and reverse polarity switch (MSR) also connected in series with both being paralleled for series connection with the series-on time delay circuit (TD), and the combination then being connected in parallel with the D.C. output terminals of both bridge rectifiers BR 100 and BR 100';

Divider switch circuit (DS) connected in parallel with the series-on time delay circuit (TD) in order to receive control from the bidirectional current detector (DID);

For operation of the system, detection is made of the polarity prevailing at both the power supply side and the load side by means of the aforementioned power side polarity detector (PDS) and the load side polarity detector (PDL), with signals outgoing from both detectors being fed to central control unit (100) for comparison so as to relatively drive polarity supplementary switch (SSF) and reverse polarity supplementary switch (SSR), followed by control of both the forward polarity switch (MSF) and the reverse polarity switch (MSR), resulting in automatic exchange of polarity for subsequent connections. In the meantime, by the actuation of series-on time delay circuit (TD) to prevent hypersensitive skipping, and by manipulation of the bidirectional current detector (DID) to control the divider switch (DS) that is in parallel with the series-on time delay circuit, the circuitry is reset automatically whenever the current decreases to a level below the prescribed one or cuts off, followed immediately by cutoff of both the positive polarity or reverse polarity switches, as defined in the foregoing, to safeguard security.

Figure 4:
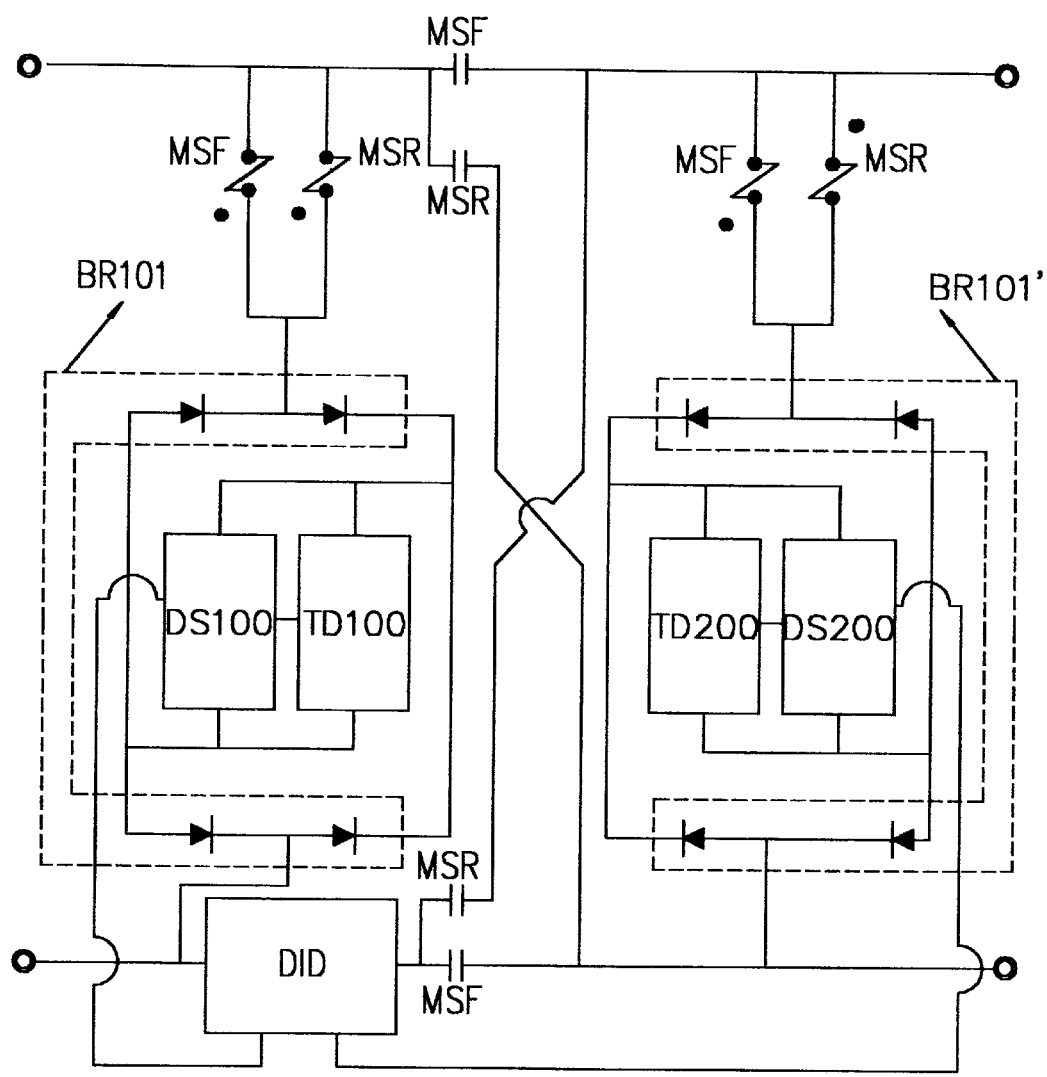
FIG. 4 is a block diagram of a preferred embodiment of the invention applied to a dual winding type polarity detector, through mechanical/electrical relay magnetizer stimulation.

FIG. 4 is a block diagram of a preferred embodiment of the invention applied in the instance of a polarity detection means to identify instantaneous polarity by the magnetization of winding sets using mechanical/electrical relay, as follows:

two sets of parallel magnetization switches, namely, forward polarity switch (MSF) and reverse polarity switch (MSR) are arranged to stimulate magnetic windings. When both sets stimulate magnetization with like polarities, the relay is in a closed drive state, but when only one set of windings is magnetized or both sets are magnetized in the reverse direction, then the relay will turn open. Both windings of the forward polarity switch (MSF), of like polarity, are installed to receive stimulation from both the power supply side and the load side, so that the same will be driven closed when the power supply side and the load side are both of a like polarity, and conduction is made. The two winding sets of the reverse polarity switch (MSR), installed to be in a reverse polarity mode, will respectively accept stimulation from both the power side and the load side, and will be driven to conduction for polarity exchange when both the power side and the load side are out of phase. This arrangement makes possible the omission of polarity detectors (PDF, PDR) as well as supplementary switches (SSR, SSF);

the provision of bidirectional current detector (DID), composed of a mechanical/electrical device or solid state electronic components, capable of bidirectional current detection, whereby a correspondent signal is released to actuate the divider switch circuit DS100 on the power side, on the one hand, and the divider switch circuit DS200, on the other hand;

divider switch circuit (DS) is connected in parallel on the power side with the series-on time delay circuit (TD), and subsequently in parallel with the positive/negative output terminals of a bridge rectifier BR101;

one of the positive polarity switch stimulation winding sets is connected in parallel with one of the negative polarity stimulation winding sets, and subsequently in series with the A.C. side of the aforementioned bridge rectifier BR101, for sole connection to the power side; whereas the remaining one of the positive polarity switch stimulation winding sets is connected in parallel with the remaining one of the negative polarity switch stimulation winding sets, and subsequently in series with the A.C. side of the aforementioned bridge rectifiers BR101', for sole connection to the load side.

As a result of the above the polarity correlation between the power side and the load side may be exchanged automatically by way of the dual winding set relay which maintains a specific polarity relationship with aforementioned power side and load side. Hypersensitive skipping is prevented by the serially connected time delay circuits TD100 and TD200, and by the intervention of bidirectional current detector (DID) and divider switches DS100, DS200 connected in parallel across both ends of the series-on time delay circuits TD100, TD200 are controlled so that the circuitry will reset itself whenever the current decreases to a level below a prescribed level or cuts off, whereupon the positive polarity switch or reverse polarity switch is cut off forthwith to safeguard security.

In summation, the invention provides an automatic polarity exchange circuit with current detection feedback capabilities, by the intervention of a current detection feedback signal to control a divider switch circuit connected in parallel with a series-on time delay circuit which in turn is connected in series with an automatic polarity exchange assembly. The time delay and divider switch circuits serve to ensure polarity correctness when a polarity-sensitive power supply is connected with a load, thereby preventing flaming due to instantaneous conduction, as well as hypersensitive skipping, and additionally to reset the circuitry once the load is removed, thus substantially enhancing safety.

What is claimed is:

1. An automatic polarity exchange circuit with current detection feedback capabilities, comprising:

an automatic polarity exchange switch assembly including a positive polarity switch and a reverse polarity switch;

a forward polarity detector connected in parallel with a reverse polarity detector, said forward polarity detector and reverse polarity detector being arranged to respectively drive the positive polarity switch and the reverse polarity switch pursuant to an outcome of polarity detection performed on said positive polarity switch and said reverse polarity switch by the forward polarity detector and the reverse polarity detector; and a time delay circuit connected in series with said automatic polarity exchange switch assembly and arranged, together with a division switching circuit controlled by a load current detection circuit and connected in parallel with the time delay circuit, to prevent a hypersensitivity effect resulting from control operation, said division switching circuit being arranged to conduct when a working current is detected by the load current detection circuit as a result of a correct linkage of polarities on the power side and load side yielding an output, wherein said divider switching circuit operates as a replacement for the time delay circuit so that the automatic polarity exchange switch assembly will continue operation while the time delay circuit is reset to a standby state, and wherein when a load breaks open or a load current scales down, the automatic polarity exchange switch assembly is cut off to cut off power to the load and the automatic polarity exchange circuit resets itself.

2. An automatic polarity exchange circuit as claimed in claim 1, wherein:

said forward polarity detector is arranged to drive a positive polarity supplementary switch in the automatic polarity exchange switch assembly with control power when detected power is of a positive polarity, and in turn to operate said positive polarity switch;

said reverse polarity detector is arranged to drive a reverse polarity supplementary switch in the automatic polarity exchange switch assembly with control power when the detected power is of a reverse polarity, and in turn to operate said reverse polarity switch;

said positive polarity supplementary switch is connected in series with a control end of the forward polarity switch, and said reverse polarity supplementary switch is connected in series with a control end of the reverse polarity switch, both the forward polarity switch and the reverse polarity switch being controlled by the time delay circuit, the forward polarity switch being arranged to connect the power supply and the load side by way of the time delay circuit when both are of a like polarity and the reverse polarity switch being arranged to connect the power supply and the load side when both are of contrary polarity with respect to each other;

said divider switching circuit is connected in parallel with the time delay circuit controlled by the load current detector; and said load current detector is arranged to drive a divider switch in said divider switching circuit into conduction when the load current exceeds a prescribed level, and to drive the divider switch to an OFF state when the current scales down to a level below the prescribed level or suspends, whereby:

when the power supply and the load are in parallel and both are in phase, the positive polarity switch will function after the duly delayed time so that the power supply and load are connected, and, when the current is greater than the prescribed level, a signal from the load current detector will drive the divider switch circuit to bring about a division of current so as to maintain the circuit in normal operation and to reset the serial time delay circuit;

when the power supply and the load are in parallel, and both are out of phase with each other, the reverse polarity switch will function after the duly delayed time, so that the power supply and the load are exchanged in polarity, resulting in an in-phase conduction, and when the current is greater than the prescribed level, a signal from the load current detector will drive the divider switch circuit to conduction, so as to maintain circuit operation and reset the serial time delay circuit; and when the load current decreases to a level below the prescribed level or when the load is removed, the current is cut off, the divider switch circuit will open, and the system reset.

3. An automatic polarity exchange circuit with current detection feedback capabilities, comprising:

a bi-directional current detector capable of bi-directional current detection and arranged to produce a polarity identification signal that controls a divider switch circuit on a power supply side;

a power supply side polarity detector arranged to detect a load side polarity and produce a polarity identification signal arranged to be supplied to a central control unit;

a load side polarity detector arranged to detect a load side polarity and produce a correspondent signal arranged to be supplied to the central control unit;

wherein said central control unit is arranged to receive the polarity identification signals from the power supply side polarity detector and the load side polarity detector so as to drive a positive polarity supplementary switch and a forward polarity switch in case the power supply side and the load side are in phase with each other, but to drive the reverse polarity switch and the reverse polarity supplementary switch in the event both are out of phase with each other, thus executing polarity exchange for useful interconnections, wherein a first bridge rectifier having an A.C. terminal is connected in parallel with the power supply side, and a second bridge rectifier is connected in parallel across both terminals of the load, the D.C. output of both bridge rectifiers being parallel connected with like polarity so as to deliver power to the central control unit;

wherein said forward polarity supplementary switch and forward polarity switch are connected in series; and said reverse polarity supplementary switch and reverse polarity switch are also connected in series with both being parallel connected for series connection with a series-on time delay circuit, and the combination of the time delay circuit, the forward and reverse polarity supplementary switches, and the forward and reverse polarity switches then being connected in parallel with D.C. output terminals of the first and second bridge rectifiers;

wherein said divider switch circuit is connected in parallel with the series-on time delay circuit in order to receive control from the bidirectional current detector, wherein when detection is made of the polarity prevailing at both the power supply side and the load side by said power side polarity detector and said load side polarity detector, said polarity identification signals are supplied to the central control unit for comparison so as to relatively drive polarity supplementary switch and reverse polarity supplementary switch, followed by control of both the forward polarity switch and the reverse polarity switch, resulting in automatic exchange of polarity for subsequent connections, and wherein to prevent hypersensitive skipping, and by manipulation of the bidirectional current detector to control the divider switch (DS) that is in parallel with the series-on time delay circuit, the circuitry is reset automatically whenever the current decreases to a level below the prescribed one or cuts off, followed immediately by cutoff of the positive polarity or reverse polarity switches.

4. An automatic polarity exchange circuit with current detection feedback capabilities, comprising:

a relay made up of a forward polarity switch, and a reverse polarity switch, said forward polarity switch and said reverse polarity switch each having a set of two magnetic windings, wherein when respective said magnetic windings in said forward polarity switch and said reverse polarity switch are magnetized with like polarities, the relay is in a closed drive state, and when only one set of windings is magnetized or both sets are magnetized in the reverse direction, then the relay will be in an open state, the two magnetic windings of the forward polarity switch, of like polarity, being installed to receive stimulation from both the power supply side and the load side so that the forward polarity switch will be driven closed when the power supply side and the load side are both of a like polarity, and conduction is made, and the two magnetic windings of the reverse polarity switch, installed to be in a reverse polarity mode, will respectively accept stimulation from both the power side and the load side, and will be driven to conduction for polarity exchange when both the power side and the load side are out of phase; and a bi-directional current detector arranged to provide bidirectional current detection and to provide a current detection signal to actuate a first divider switch circuit on the power side and a second divider switch circuit on the load side, wherein said first and second divider switch circuits are connected in parallel on the power side with respective series-on time delay circuits and subsequently in parallel with positive/negative output terminals of a first bridge rectifier, wherein of the positive polarity switch magnetization windings is connected in parallel with one of the negative polarity switch magnetization windings, and subsequently in series with an A.C. side of said first bridge rectifier for sole connection to the power side;

wherein a remaining one of the positive polarity switch magnetization windings is connected in parallel with a remaining one of the negative polarity switch magnetization windings, and subsequently in series with the A.C. side of a second bridge rectifier for sole connection to the load side, wherein as a result of said magnetization connections, a polarity correlation between the power side and the load side may be exchanged automatically by way of said relay which maintains a specific polarity relationship with said power side and load side, and wherein hypersensitive skipping is prevented by the time delay circuits and by the intervention of said bi-directional current detector and divider switches connected in parallel across both ends of the series-on time delay circuits, said bi-directional current detector being arranged to control said first and second divider switches so that the circuitry will reset itself whenever the current decreases to a level below a prescribed level or cuts off, whereupon the positive polarity switch or reverse polarity switch is immediately cut off.

* * * * *